(12) United States Patent
Annen et al.

(10) Patent No.: US 6,349,683 B1
(45) Date of Patent: Feb. 26, 2002

(54) MINIATURE GENERATOR (75) Inventors: Kurt D. Annen, Rowley; David B. Stickler, Carlisle; Paul L. Kebabian, Acton, all of MA (US)

(73) Assignee: Aerodyne Research, Inc., Billerica, MA (US)

( * ) Notice: Subject to any disclaimer, the term of this patent is extended or adjusted under 35 U.S.C. 154(b) by 0 days.

(21) Appl. No.: 09/664,250

(22) Filed: Sep. 18, 2000

Related U.S. Application Data (60) Provisional application No. 60/216,276, filed on Jul. 6, 2000.

(51) Int. Cl.[7] .................................................. H02P 9/04
(52) U.S. Cl. ..................................................... 123/46 E
(58) Field of Search ....................................... 123/46 E (56) References Cited

U.S. PATENT DOCUMENTS 3,675,031 A * 7/1972 Lavigne ..................... 123/46 E
3,766,399 A * 10/1973 Demetrescu ............... 123/46 E

* cited by examiner

Primary Examiner—Marguerite McMahon
Assistant Examiner—Jason Benton
(74) Attorney, Agent, or Firm—Edwin H. Paul, Esq.

(57) ABSTRACT

A miniature, two cycle engine with a linear electrical generator is presented. The piston attaches to the spring and a moving coil is also attached to the spring and/or rod assembly distal from the cylinder head. The spring is formed with an integral end fitting from one piece of preferably titanium stock. A permanent magnet is arranged where the coil moves within the magnet air gap to produce electrical power. The system operates at the resonant frequency of the spring and active mass. A glow plug provides the ignition source and hydrocarbon fuel is used. The package is about an inch wide and about 2–3 inches long, and it weighs about 30 grams.

14 Claims, 8 Drawing Sheets

MINIATURE GENERATOR

CROSS REFERENCE TO RELATED APPLICATIONS

This application claims priority from a Provisional Patent application of the same title, inventorship and ownership as this application. The Provisional Application was filed on Jul. 6, 2000 and has been assigned the Ser. No. 60/216276.

This invention was made partially with the U.S. Government through support from the DARPA Small Business Innovative Research (SBIR) Program, Contract No. DAAHO1-98-C-R190. The U.S. Government has certain rights in the invention.

BACKGROUND OF THE INVENTION

1. Field of the Invention

The present invention relates generally to miniature power sources and, more particularly to miniature two-cycle combustion engines combined with linear electrical generators.

2. Background Information

There are many applications (for example, in tools, toys, bicycles, recreational equipment, micro surveillance airplanes, laptop computers, and other electronic equipment) where small, light-weight, high power density and energy capacity, power sources are needed.

At the present time such applications are being filled with items from a variety of battery technologies. Lithium batteries, for example, are being used as long-lived power sources especially for computer memories. Nickel-cadmium and nickel-metal batteries are used for power tools. Other electrochemical systems are used for other applications. All batteries, however, have poor power density and energy density (less than 300 watt-hours per kilogram). These parameters have limited the use of such batteries where power and weight are factors.

Fuel cells are another possible candidate for such uses, but despite their promise they have proven to be technologically difficult to develop for these applications. Also miniature gas turbines and the like are possibly being developed for high power miniature power source applications.

Yet another approach is to reduce the size of a standard two or four stroke engine as the driver of an electrical generator. But this approach entails a number of problems. One set of problems of directly reducing the size of such engines involves the small linkages, articulated joints, valves, etc. that would require precise machining and close tolerances. Although such engine/generators have been built and operated, as a standard internal combustion engine is reduced in size, such mechanics become expensive, the power density and energy capacity are reduced, and the mechanical linkages have shorter lives (specially if attempts are made to maintain power density by incurring higher stresses and loads). While in situations where shaft power is required these problems might be tolerable (model aircraft engines, for instance), for electrical power the need for a separate generator and the above discussed problems make this approach unattractive.

An M.I.T. Master's thesis, submitted in June of 1996, by Matthew D. Greenman, entitled *Design and Construction of a Miniature Internal Combustion Engine*, describes a miniature internal combustion engine generator design. This thesis is incorporated by reference herein. This thesis describes an approach to a design that is meant to take advantage of the high energy content of hydrocarbon fuels (in the range of 40,000 J/g) while eliminating many moving parts found in a standard internal combustion engine. The engine is a two-cycle piston engine with a cylinder bore and a stroke of a few millimeters. The piston is attached to a mechanical spring and an induction coil that is positioned to reciprocate in the air gap of a permanent magnet. Electrical power is delivered from the induction coil to the external load. The engine operates at or near the resonant frequency of the active-mass-spring (active mass=masses of coil+ standoff+piston+piston rod+portion of the spring) system. As mentioned above, there are no valves or articulated mechanical linkages. The design presents an approach to many issues but does not fully examine practical solutions.

One troublesome area in the thesis design is the double helix spring made by forming wire and then brazing or welding the ends to separate end pieces. This spring design suffers from tolerance problems and does not restrict transverse movement enough for a practical design. In addition, it has the practical difficulty of attaching the end pieces while maintaining perfect symmetry of the two helices.

There is a continuing need for and it is an object of the present invention to provide a high power density, high-energy capacity, miniature engine generator.

There is a need and it is another object of the present invention to reduce the number of parts and to control better the mechanical parameters and to reduce the number of assembly steps to fabricate a miniature engine generator.

SUMMARY OF THE INVENTION

The objects set forth above, as well as further and other objects and advantages of the present invention, are achieved by the embodiments of the invention described hereinbelow.

A miniature internal combustion engine generator invention is constructed with a cylinder head, a fuel-air-mixture inlet port, an exhaust port, and an axial groove in the cylinder wall that provides a transfer port to allow the engine to run in a two-cycle mode. A piston is constructed and arranged to travel reciprocally within the cylinder, and a rod extends axially from the piston. In another aspect of the invention, the operation of the motor may be of the four-cycle variety.

A spring formed, preferably machined, from one piece of metal stock, preferably titanium or an alloy thereof, is formed as a double helix. However, a triple helix or greater can be used to advantage. One end of the spring is fixed in relation to the cylinder head, and the rod is attached to the other end of the spring.

At the end of the spring and/or rod, distal from the piston, an electric induction coil is fixed and located so that the coil reciprocates within the air gap of a permanent magnet following the piston as the motor operates. Alternatively, the coil can be fixed and the magnet moved.

A housing is attached to the cylinder head and extends over the spring, coil and permanent magnet. The housing may be an extension of the cylinder head assembly, in a preferred embodiment. The ends of the coil electrical wire are made available at terminals where a load made be attached and electrical power drawn.

In a preferred embodiment, one electrical lead from the coil is in electrical connection to the helix spring and the housing to which terminal may be mounted. The other lead is insulated from the spring and housing and is arranged via a weak spring to an insulated terminal. The weak spring allows the lead to move without incurring fatigue problems in the lead or spring and to provide a minimal mechanical load on the system. The electrical load is attached between the terminals. The spring is formed or made from a single piece of stock, preferably titanium or an alloy thereof, with integral end fittings. The end fittings form the mechanism whereby the spring is fixed to the cylinder head and extension and/or housing. Preferably, the end fitting is a shoulder or a threaded connection on the spring and there is a mating shelf or threaded connection on the housing or the cylinder. In a preferred embodiment, there is a mating shelf built into the joint between the housing and the cylinder and an external clamp is used to secure the spring, housing and cylinder head together. But, other means of fixing the spring to the housing/cylinder head are known and can be used to advantage in the present invention.

The spring may be attached in one embodiment at the cylinder head with the piston rod attached to the far end of the spring. But, in another embodiment, the spring is fixed to the housing distal from the cylinder head and the rod is attached to the near end of the spring. In this second embodiment the rod is farther extended through the center of the spring to attach to and thereby axially move the induction coil.

In other preferred embodiments, the electrical generator coil and magnet may be positioned between the piston and the helix spring.

For a better understanding of the present invention together with other a further objects thereof, reference is made to the accompanying drawings and detailed descriptions, and its scope will be pointed out in the appended claims.

DETAILED DESCRIPTION OF PREFERRED EMBODIMENTS

FIG. 1 a shows the cylinder head 2 of a two-cycle engine with the piston 4 at the top of its stroke. A glow plug 6 provides the ignition source. When the piston moves toward the top of the stroke, fuel-vapor/air mixture 8 is drawn into the lower chamber 10 via an inlet port 12. FIG. 1b shows the piston just after ignition on the stroke that delivers power to the rod 18 attached to the piston. The combustion products 14 are ejected via an exhaust port 16, and the piston closes off the inlet port 12 and forces the fuel 20 in the lower chamber into the transfer port 22. FIG. 1c shows the fuel in the transfer port 22 entering 24 the upper cylinder chamber 26.

Figure 1A:
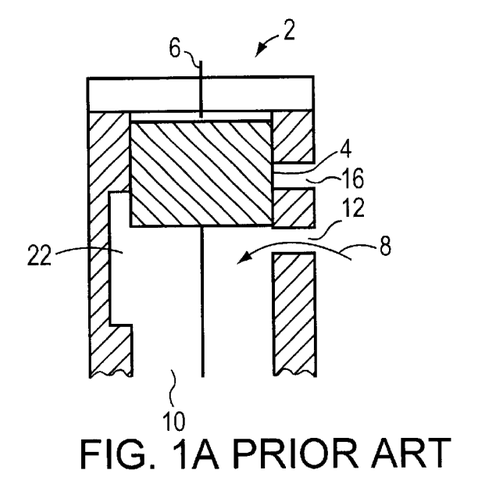
FIGS. 1a–1d are cylinder head/piston diagrams of a basic two cycle internal combustion engine.
Figure 1B:
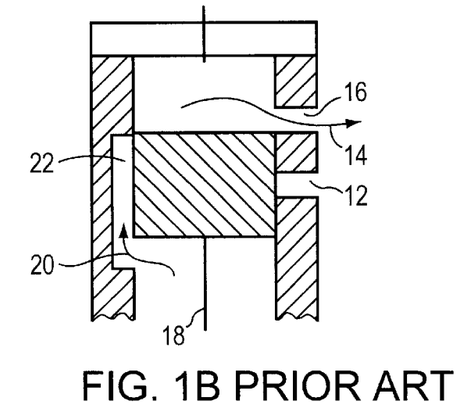
Figure 1C:
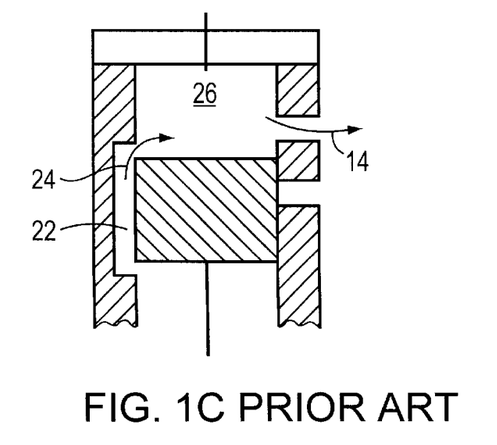
Figure 1D:
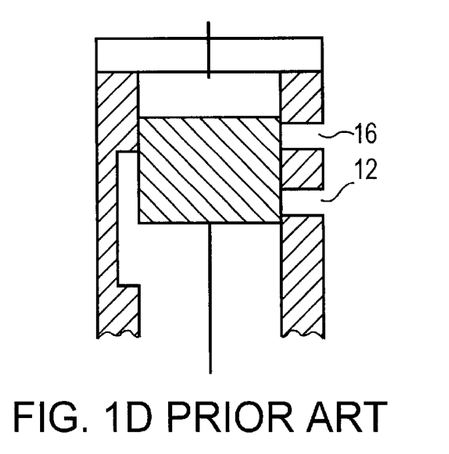

Referencing FIG. 1d, the fuel is being compressed ready for ignition in the upper chamber with the exhaust, and transfer ports closed off from the upper chamber. In another embodiment, the ignition may be caused by compression alone with no ignition source, and in yet another embodiment the engine may be a four-cycle type.

Figure 2:
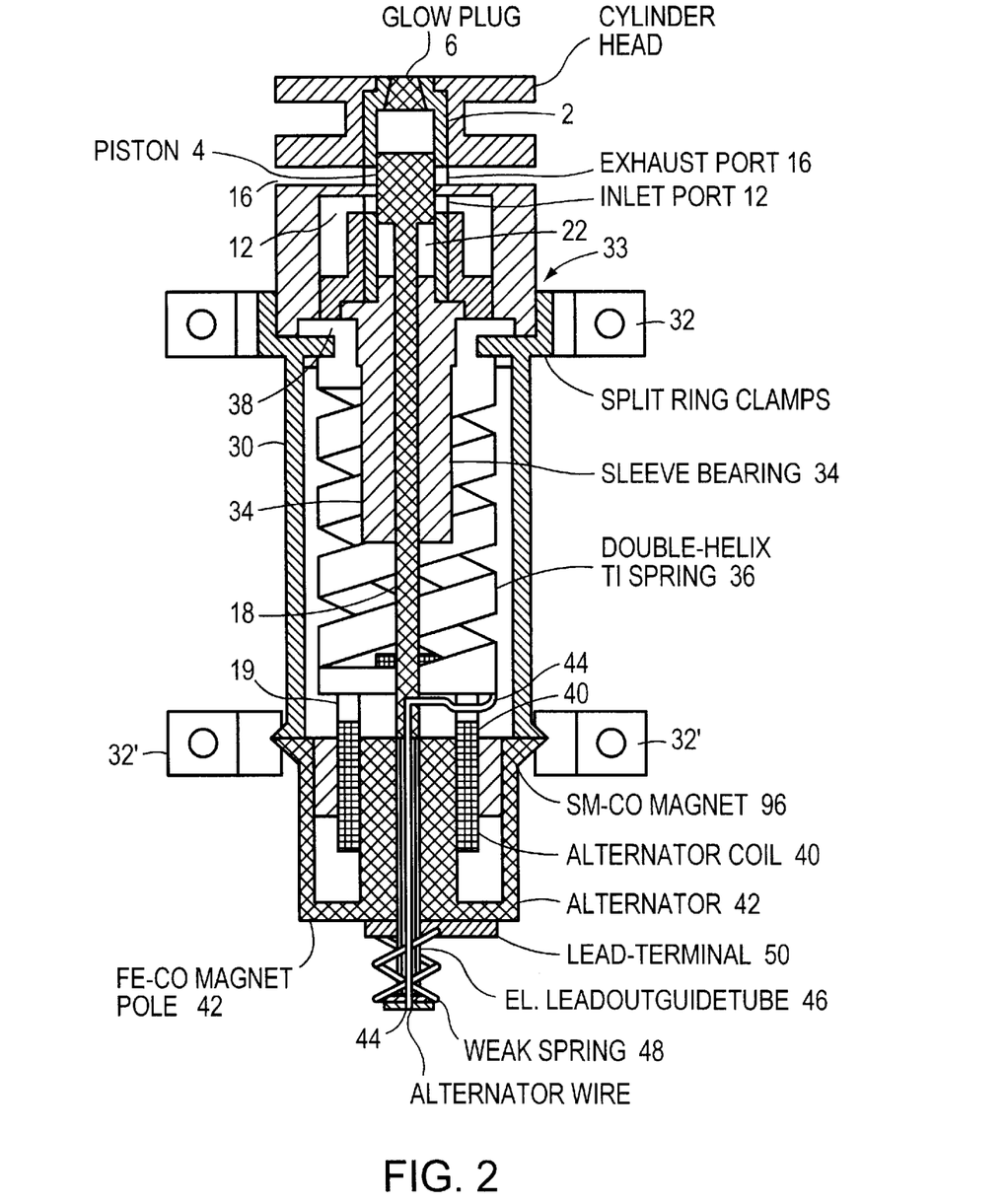
FIG. 2 is a partially sectioned view of a preferred illustrative embodiment of the invention.

FIG. 2 is a cross section view of a completed example of the present invention. The upper section 2 shows the cylinder head that was described in general terms for FIGS. 1a–1d. There are opposing exhaust ports 16, inlet ports 12, and transfer ports. The transfer port 22 is shown behind the piston/rod and the opposing transfer port is on the part of the cylinder wall taken away by the sectioned drawing. The cylinder head 2 is fixed securely to a housing 30 by split ring clamp 32. However, the housing may be an extension of the cylinder head assembly wherein in no clamping would be necessary. The rod 18 that extends axially from the piston 4 is guided by a sleeve 34 that is fitted securely to the cylinder head/housing and spring assembly. The sleeve is of aluminum preferably with an insert (not shown) made from VESPEL® (trademark owned by DuPont) polyimide or other like bearing material known in the art.

A one-piece spring 36 in this embodiment a machined spring with an integral end fitting 38 encircles the sleeve and rod. The spring is at least a double helix and is shown attached and secured to the housing where the housing and the cylinder head meet by the split ring clamp 32.

In an alternative embodiment, not shown the surface 33 where the housing 30 and the cylinder head 2 meet may be threaded thereby obviating the split ring clamp 32. This surface 33 may also be an alignment surface formed to ensure the axial alignment of the piston/rod and the spring 36.

An alternator coil 40 in a preferred embodiment is attached via a standoff or standoffs 19 to the far end of the spring 36 and extends axially into the air gap of a fixed magnet 42. Alternatively, a coil of increased length could be attached directly to the spring. The operation is that as the piston reciprocates the coil follows, breaking the magnetic flux lines in the air gap and thereby generating electrical energy from the mechanical motion.

The lead 44 from the coil is insulated from the other conductive materials in the assembly and runs out the bottom of the assembly through a guide tube 46. At the bottom the lead 44 is electrically and mechanically attached to a weak spring 48 that is also insulated from the housing, etc. The other lead from the coil is electrically attached to the metallic spring and thereby to the housing and the other conductive portions if the assembly. The weak spring is also connected to a terminal 50 mechanically fixed to but electrically insulated from the housing, etc. The load connections are made to this terminal with the electrical return of the load connected to the housing or some other common connection terminal (not shown) electrically in contact with the housing and the spring. Of course other arrangements for bringing out the electrical leads from the moving coil can be made, including sliding connections as known in the art. Alternatively, one or both coil leads may be attached to one or both arms of the helices. The leads are attached along their entire length, using a flexible adhesive. Since the wire diameter will be much less than the cross-section of the helices, the wire and adhesive are highly compliant and therefore have minimal effect on the spring motion. This arrangement is advantageous in that it avoids the need for a guide tube and a weak spring, and reduces the risk of fatigue of the wire. Such adhesive is known in the art.

Figure 3:
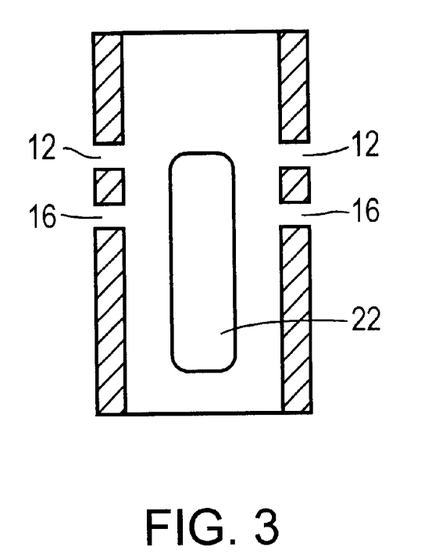
FIG. 3 is a section view of the cylinder.

FIG. 3 is a sectioned side view of the cylinder 2 showing the opposing intake 12 and exhaust 16 ports and one of the opposing transfer ports 22. The preferred material is stainless steel.

Figure 4:
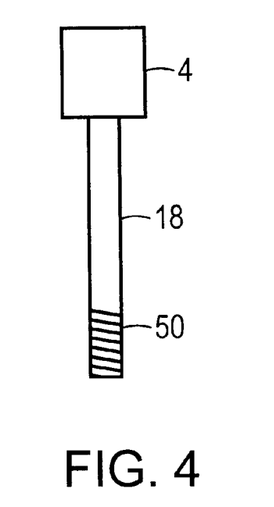
FIG. 4 is a view of the piston and rod.

FIG. 4 is a side view of the piston and axially extending rod, both preferably made of stainless steel. The rod ends with a threaded section 50 that allows the rod to be bolted to the spring, although there are other known ways to make this connection.

Figure 5:
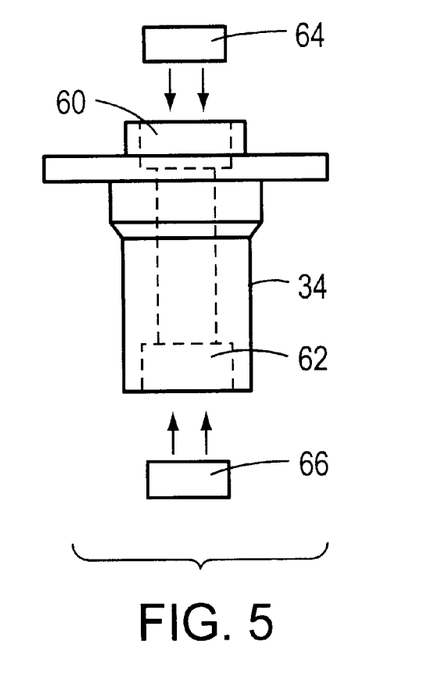
FIG. 5 is a side view of the sleeve and insert.

FIG. 5 is a side view of the sleeve bearing 34 with a sleeve insert bore at the top 60 and the bottom 62 arranged to accept the inserts 64 and 66. The sleeve is preferably aluminum and the inserts VESPEL®.

Figure 6:
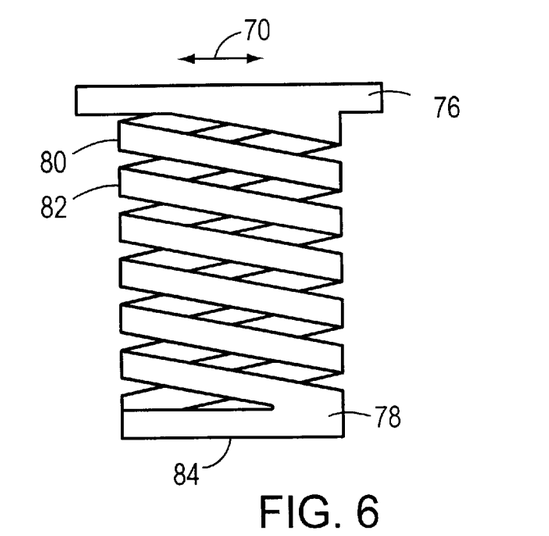
FIG. 6 is a side view of the helix spring.

FIG. 6 is a side view of the machined double helix spring. In a preferred embodiment, the diameter 70 of the main portion of the spring is about 1.1 centimeters and the shoulder about 1.2 centimeters. The total length of the spring including the shoulder 76 at the top and the bottom end 78 is about 1.8 centimeters. The double helix shows the opposing helixes 80 and 82. The pitch of each helixes, in a preferred embodiment, is about 0.6 centimeters. The end piece 78 is arranged with a tapped opening 84 that accepts the threaded end of the rod. In a preferred embodiment, the spring is machined from a single piece of a titanium alloy, but the spring may be formed by other methods as one piece.

The forming as or in one piece has an advantage in that the dimensions and shape can be precisely controlled as compared to bending a wire. Moreover, the cross section form of a coil segment can be square or some other shape that advantageously would resist transverse motion and so better maintain alignment. Moreover, the dimensions of the spring can be controlled so that the mechanical parameters defining the spring can be well controlled. Those parameters include, but are not limited to, the spring index, the stiffness, the oscillating frequency, the mass, the Q (the ratio of stored to dissipative energy), stresses, etc.

The alignment is a critical factor if the rod is rigid and is rigidly attached to the piston in that: 1) the rod is fixed to the piston and any transverse movement on the rod will cause the piston to miss-align in the cylinder causing friction and excessive wear; and 2) the clearance between the coil and the magnet is very small and transverse movement will produce contact causing friction and possible damage. Alternatively, the rod may be designed to be somewhat flexible, or connected to the piston using a flexible and/or readily displacing joint.

Figure 7A:
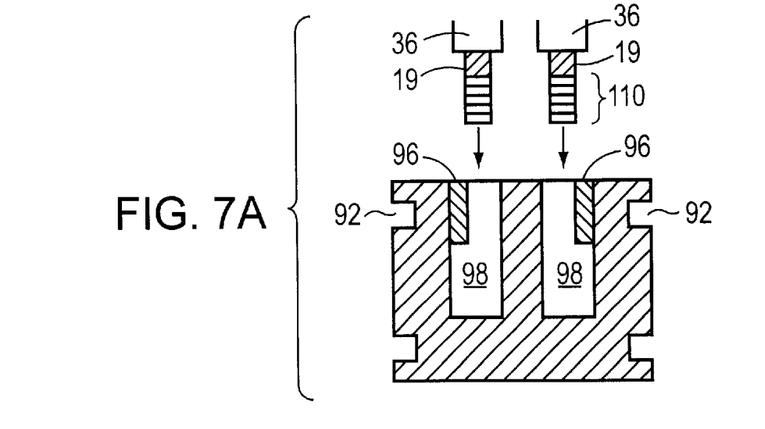
FIG. 7a is a sectioned view of the permanent magnet and coil.

Beneath the spring, and fixed to the bottom of the housing by a split ring clamp 32, is a permanent magnet assembly 42. This assembly is shown in FIG. 7a and is composed of three major pieces: an outer pole shown in cross section. The indentations 92 are for attaching the outer pole to the housing. The magnet pole 90, in another preferred embodiment, may be made as two pieces joined together. Preferable the magnetic material is HIPERCO® 50A, and the material for the magnet 96 is samarium cobalt or alternatively neodymium-iron-boron.

Figure 7B:
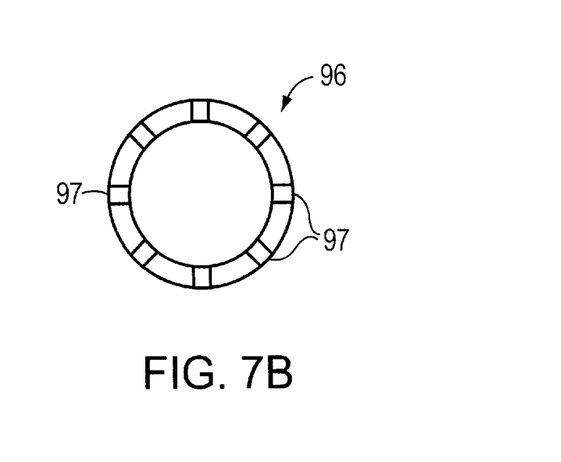
FIG. 7b is a top view of the magnet insert.

The magnet 96 in FIG. 7a is shown from a top view in FIG. 7b and is segmented with divisions 97 that allow the magnetic field to be oriented toward the center and therefore through the air gap 98 of FIG. 7a. While a single-piece magnet with a purely radial field is desired, it is difficult to make at these scales; a segmented magnet is an expedient approach for obtaining an approximately radial field.

Referring back to FIG. 7a the coil length 110 is designed to be equal to the height of the air gap 98. This has been found to provide a reasonable tradeoff between weight of the coil and energy generation, while reducing electrical dissipation within the coil. With the coil equal to the length of the magnet air gap, means are provided for positioning the coil relative to the magnet. In a preferred embodiment, a standoff 19, of FIG. 1 and 7a, allows the coil to be positioned from the bottom of the spring 36 as desired to accommodate the coil air gap interaction. The standoffs may be attached to the bottom of the is spring by bolting, adhesives or other known methods.

Figure 8:
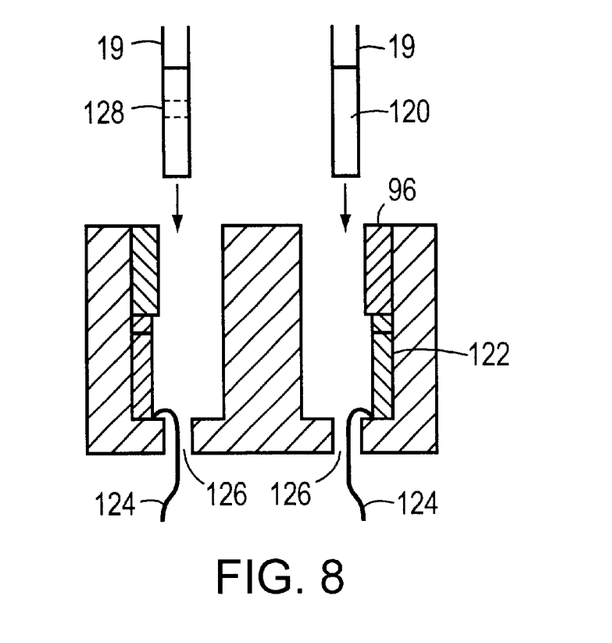
FIG. 8 is an alternative embodiment of the invention.

In another embodiment shown in FIG. 8, a shorting ring 120 inductor replaces the moving coil and a stationary induction coil 122 is placed below the magnet 96. The moving shorting ring coil has no external leads so obviating the need to get output leads from the moving coil. Power is transferred to the stationary coil via the transformer-like action of the shorting coil moving in the air gap of the magnet and inductively transferring energy to the stationary coil. Leads 124 from the stationary coil are not moving and are brought out to terminals for connecting to a load.

The coil magnet assembly is arranged with air venting holes 126 to reduce heat in the assembly. Venting holes 128 may also be provided in the moving shorting ring.

Figure 9:
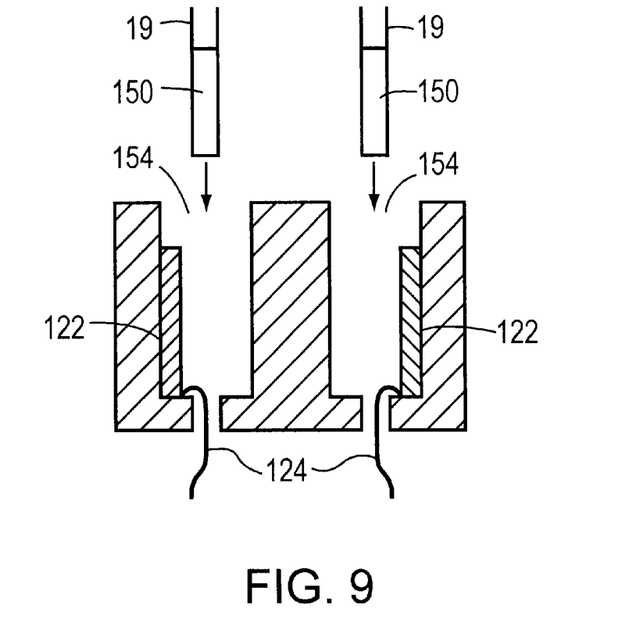
FIG. 9 is a diagram of an embodiment using a shorting coil.

FIG. 9 shows an alternate embodiment where the permanent magnet 150 is fixed to the moving end of the spring with standoffs 19. An induction coil 122 is fixed in the housing and defines an air gap 154 in which the magnet moves as the engine runs.

The engine-generator system, in a preferred embodiment, runs at about eight hundred Hertz; the stroke to bore ratio is about one; and no lubricating oil will be used. Instead, a solid film lubricant such as TiN will be used.

Fuel storage and control are needed for a practical operating engine generator. One preferred embodiment provides a running time of about one hour for the invention. Propane and dimethyl ether or similar liquids having sufficient vapor pressures to provide gaseous vapors are preferred fuels. Such gases mix easily with air and operate over a wide range of environmental conditions while still providing fuel delivery without need of complex controls and allowing storage in the liquid state.

Figure 10:
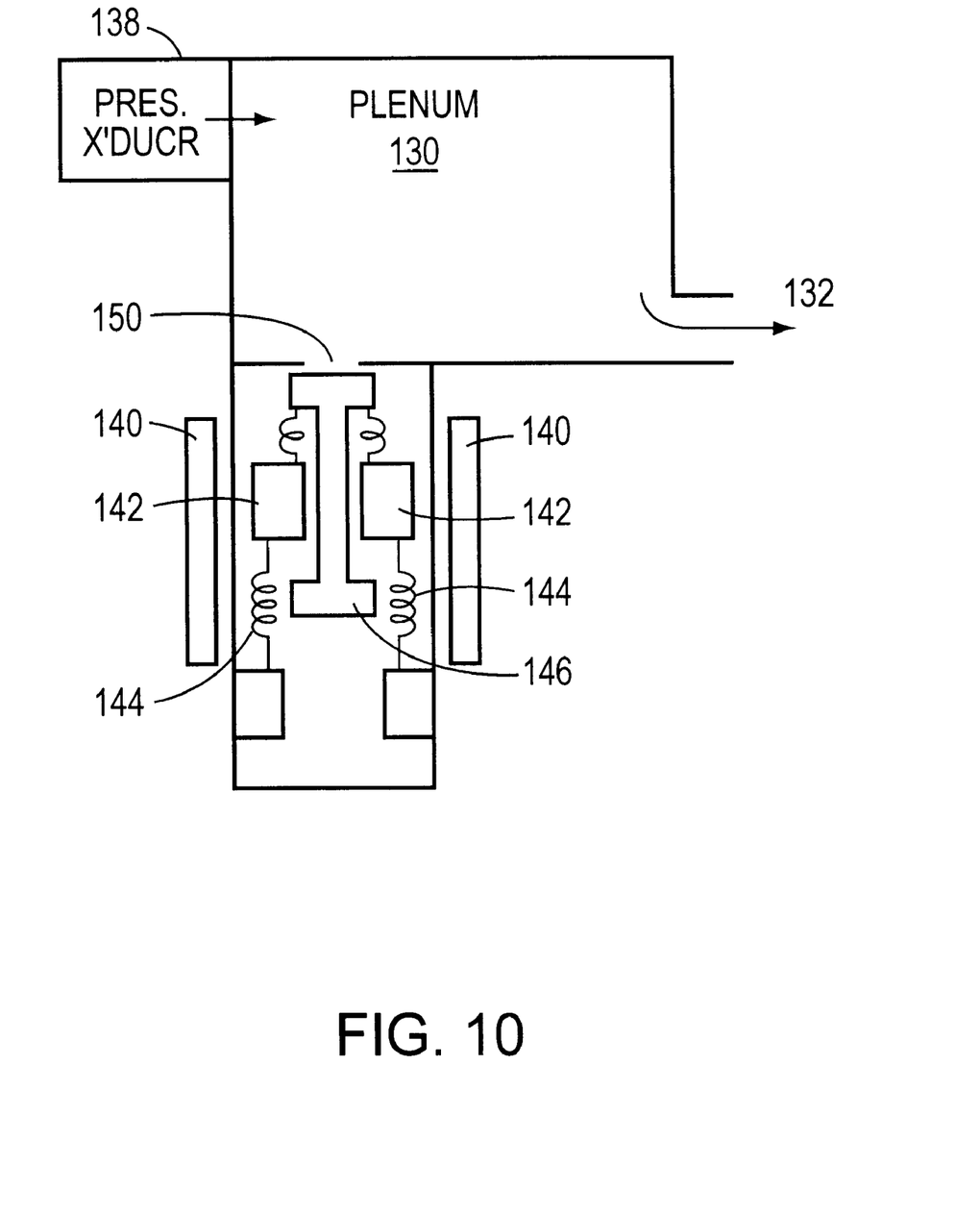
FIG. 10 is a diagram of a fuel delivery system.

One practical fuel storage delivery system is shown in FIG. 10, it comprises a flow control valve, a pressure sensor, plenum, and a fuel storage chamber. The combination of valve, pressure sensor and plenum function as a pressure regulator over a wide range of fuel delivery rates. The plenum 130 is held at essentially constant pressure during engine operation providing a constant flow 132 of vapor to the engine intake port. Operation is as follows: when the pressure transducer 138 senses a lower pressure, it send a power pulse to the solenoid 140 which drives the slide hammer 142 against the return spring 144 resulting in the valve stem 146 moving away from the opening 150 into the plenum. Fuel flows into the plenum. When the power pulse to the solenoid ends, the return spring, buffer spring, and the fuel pressure together drive the valve stem back closing the opening. The result is a charge of fuel delivered into the plenum. The system design provides for a substantially constant fuel pressure in the plenum for reliable fuel delivery to the engine. Other fuel delivery means are known in the art, particularly those used with model aircraft engines.

Starting the engine can be accomplished by driving current into the alternator load leads, thereby using the generator as a linear electric motor. Alternatively, the engine may be started by cranking via a mechanical linkage driving the rod or the free end of the spring. Power is provided to the glow plug prior to starting and removed after the engine reaches operating temperature.

Figure 11A:
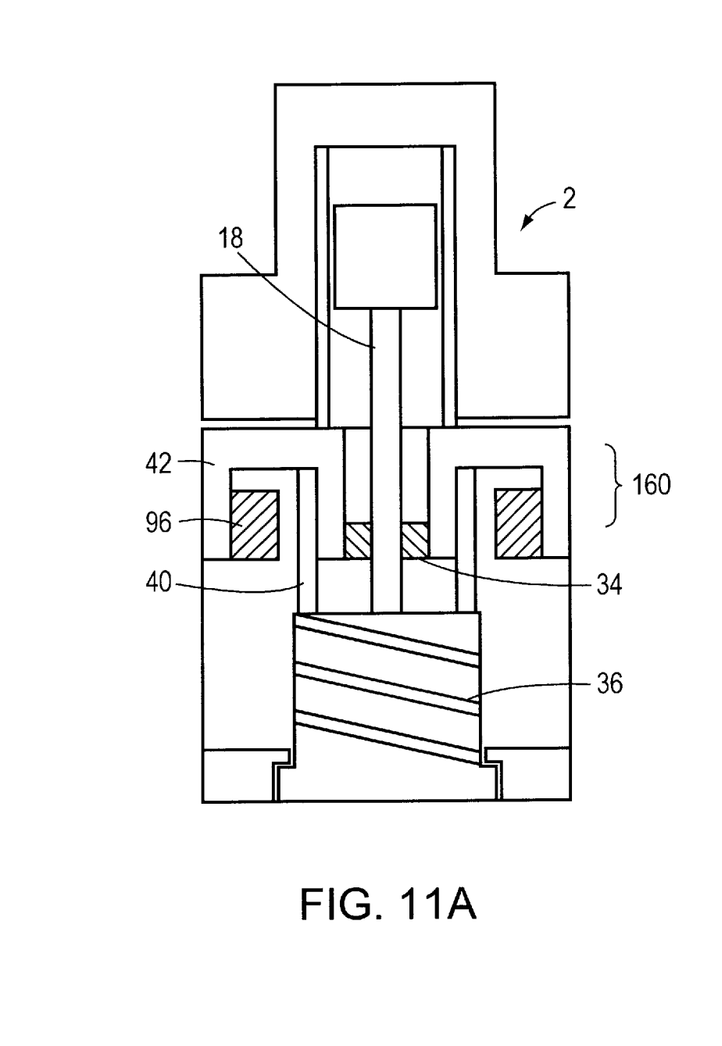
FIG. 11a and 11b are sectioned views of alternative embodiments.
Figure 11B:
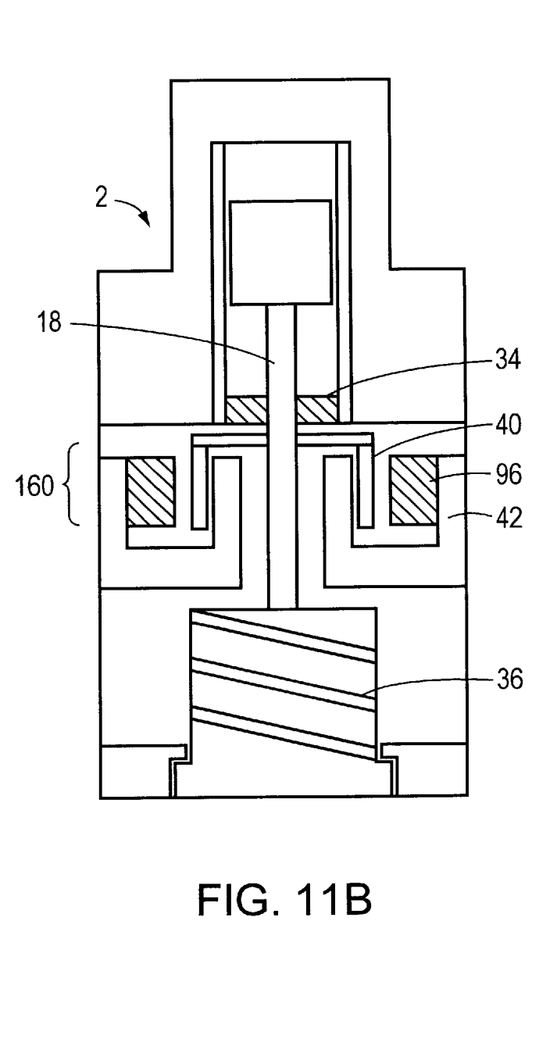
Figure 12A:
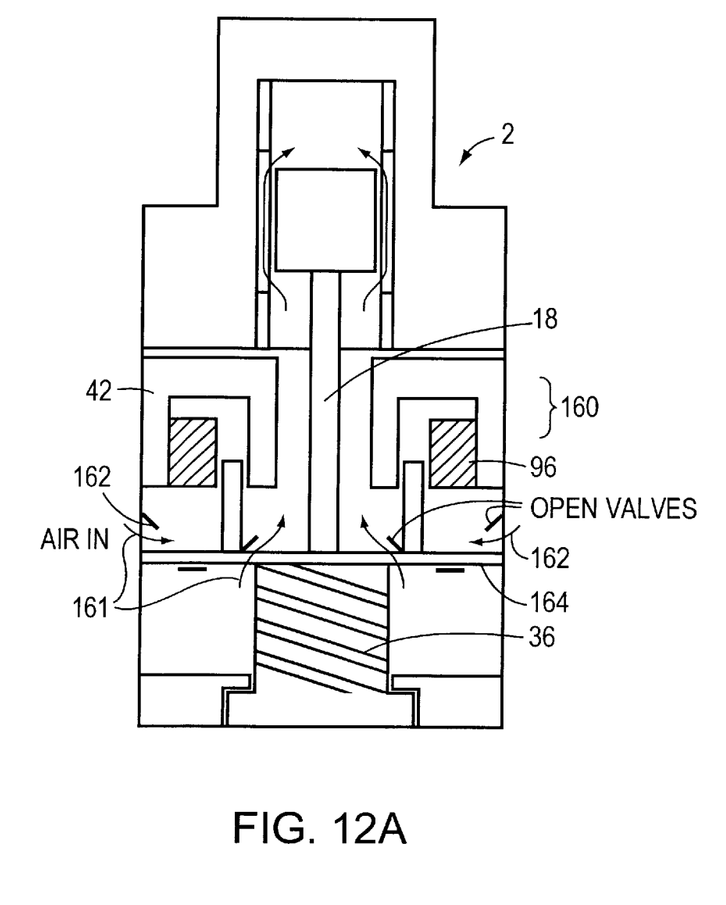
FIG. 12a and 12b are sectioned views showing intake details.
Figure 12B:
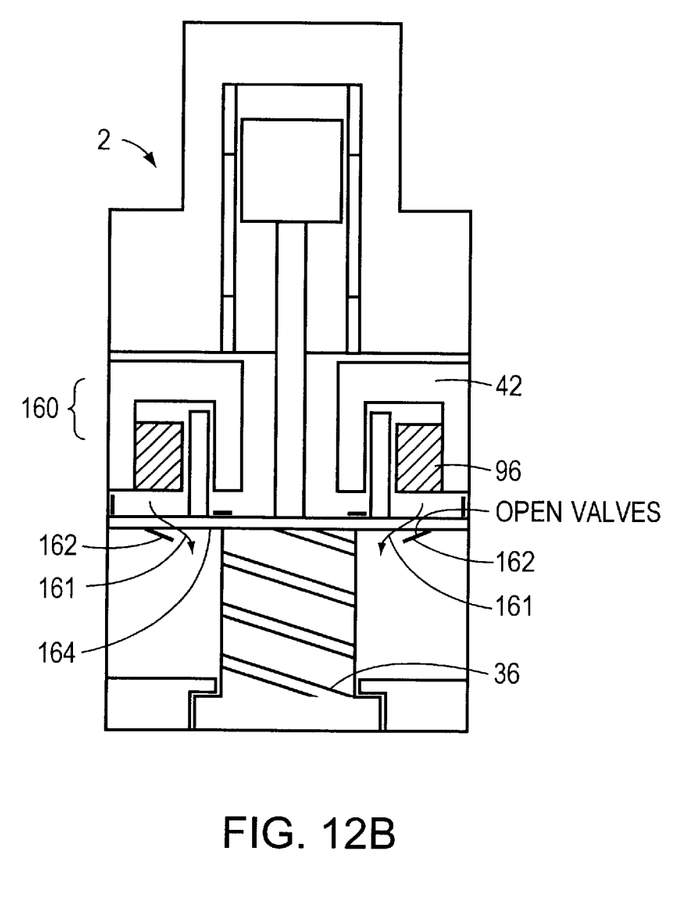

FIGS. 11a, 11b, 12a and 12b show alternative embodiments where the generator is positioned between the cylinder head 2 and the double helix spring 36. In FIG. 11a the alternator coil 40 is attached to the helix spring 36 and it is attached to the rod 18 in 11b. FIGS. 12a and 12b are a variation of FIG. 11a except that the sleeve bearing 34 (shown for illustration) is omitted and the air intake is arranged 161 with reed valves 162 at a disk attached to the free end of the helix spring 36.

What is claimed is:

1. A miniature engine generator comprising:
    a cylinder head, the cylinder defining axial and radial directions, the cylinder head having a closed end and an open end, and the cylinder head having inlet and exhaust ports,
    a continuation of the cylinder head extending axially from the open end and constructed with a mechanical fitting placed on the continuation,
    means for introducing fuel and air and means for removing exhaust, means for igniting the fuel
    spring with integral end fittings formed from one piece, wherein one end fitting mates with the mechanical fitting thereby forming an integral cylinder head, continuation and spring assembly, and the other end fitting aligned axially to accept a rod,
    a piston constructed and arranged to travel reciprocally within the cylinder,
    the rod with a proximate end attached to the piston and extending axially in the open end direction, the distal end of the rod fixed to the spring other end fitting,
    a permanent magnet fixed to the continuation wherein the permanent magnet defines a gap,
    a coil fixed to the spring and arrange to travel within the gap, means for making electrical connections to the coil, wherein, when the motor is operating, electrical energy is available from the electrical connections.

2. The engine generator as defined in claim 1 wherein the spring is a double helix, and the continuation is a housing fixed to the cylinder head.

3. The engine generator as defined in claim 1 wherein the spring is at least a triple helix.

4. The engine generator as defined in claim 1 wherein the active mass and spring define a resonant frequency and where the motor generator operates at substantially that resonant frequency.

5. The engine generator as defined in claim 1 wherein the means for igniting comprises a glow plug.

6. The engine generator as defined in claim 1 wherein the spring is machined from titanium and the permanent magnet is made of samarium-cobalt.

7. The engine generator as defined in claim 1 wherein the mechanical fitting is a shoulder constructed adjacent to the cylinder head and the rod is attached to the spring distal from the cylinder head.

8. The engine generator as defined in claim 1 wherein the mechanical fitting is constructed on the spring distal from the cylinder head and the rod is attached to the spring adjacent to the cylinder head.

9. The engine generator as defined in claim 1 wherein the mechanical fitting and the end fitting comprises a threaded connection.

10. The engine generator as defined in claim 1 wherein the mechanical fitting and the end fitting comprises a clamping surface and further including a clamp to secure the spring to the cylinder head assembly.

11. The engine generator as defined in claim 1 wherein the permanent magnet is constructed of a segmented, dual, annular arrangement wherein the gap is between the annular rings.

12. The engine generator as defined in claim 1, wherein the means for making electrical connections to the coil comprise conductive leads, and further wherein the engine generator further comprises flexible adhesive that attaches at least one of the electrical leads to the spring.

13. The engine generator as defined in claim 12 wherein means for making connections to the coil comprise attaching the two electrical leads from the coil, each one to run along one arm of the helix spring, with flexible adhesive wherein the electrical leads exit at the stationary end of the helix spring.

14. A miniature engine generator comprising:
    a cylinder head, the cylinder defining axial and radial directions, the cylinder head having a compression end and an open end, and the cylinder head having inlet and exhaust ports,
    means for introducing fuel and air and means for removing exhaust,
    means for igniting the fuel,
    a housing extending axially from the open end of the cylinder head, wherein the housing is securely attached to the cylinder head, and wherein the housing cylinder head combination is constructed with a mechanical fitting,
    spring and end fittings formed from one piece, wherein a first end fitting mates with the mechanical fitting thereby forming an integral cylinder head, housing and spring assembly, and the second end fitting connects with a piston rod,
    a piston constructed and arranged to travel reciprocally within the cylinder,
    the piston rod with a proximate end attached to the piston and extending axially in the open end direction,
    the distal end of the rod fixed to a spring end,
    an induction coil fixed to the housing, the induction coil defining a gap,
    a permanent magnet fixed to the spring and arrange to travel within the gap, means for making electrical connections to the coil, wherein when the motor is operating electrical energy is available from the electrical connections.

* * * * *